UNITED STATES PATENT OFFICE.

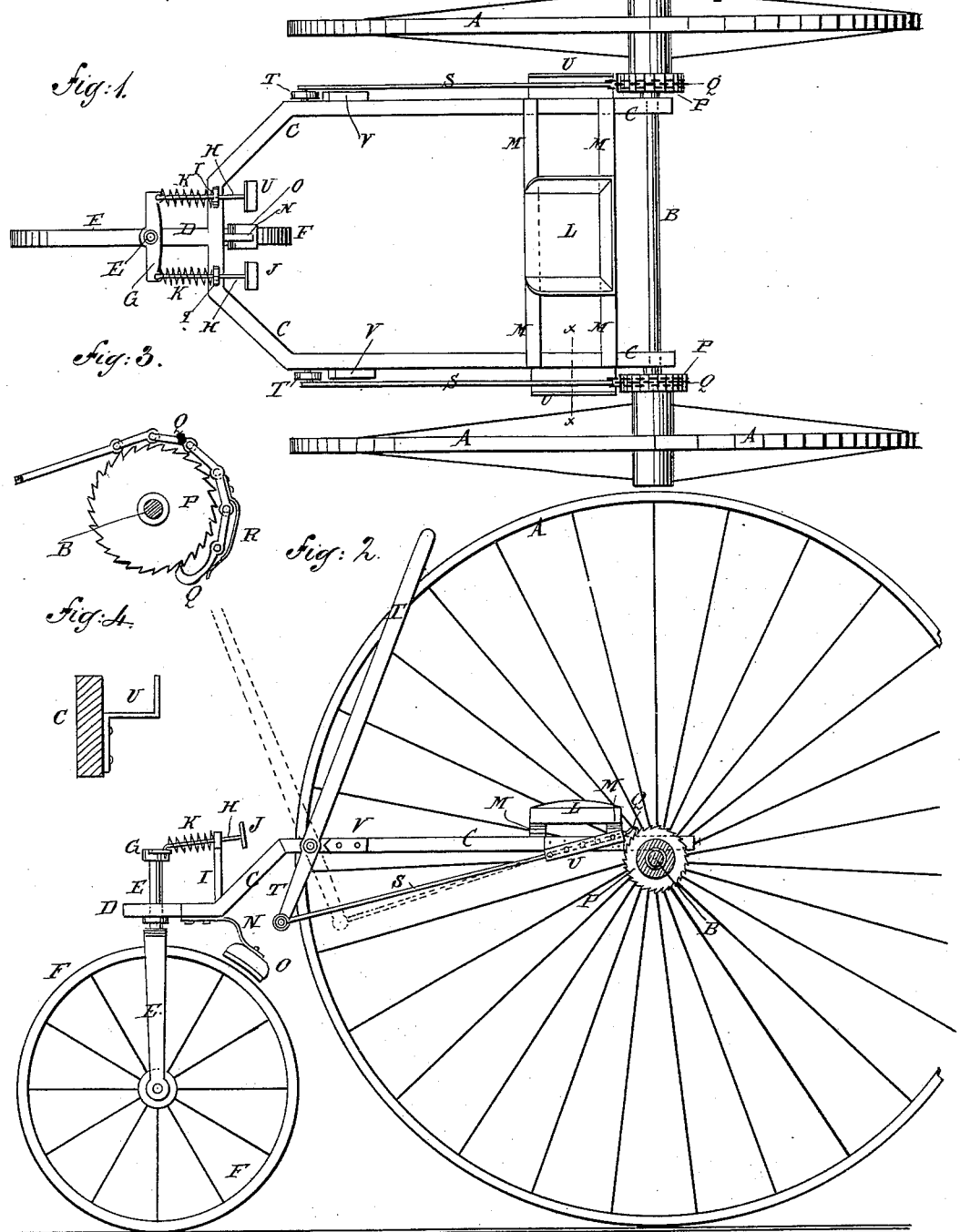

THOMAS A. DAVIES, OF NEW YORK, N. Y.

HAND-POWER VEHICLE.

SPECIFICATION forming part of Letters Patent No. 296,937, dated April 15, 1884.

Application filed December 31, 1883. (No model.)

*To all whom it may concern:*

Be it known that I, THOMAS A. DAVIES, of the city, county, and State of New York, have invented certain new and useful Improvements in Hand-Power Vehicles, of which the following is a full, clear, and exact description.

Reference is to be had to the accompanying drawings, forming a part of this specification, in which similar letters of reference indicate corresponding parts in all the figures.

Figure 1 is a plan view of my improvement, part of the drive-wheels being broken away. Fig. 2 is a side elevation of the same, partly in section. Fig. 3 is a side elevation of a ratchet-wheel and flexible pawl, enlarged, the axle being shown in section. Fig. 4 is a sectional elevation of the pawl-guide and a side bar of the frame, taken through the line $x$ $x$, Fig. 1.

The object of this invention is to simplify the construction and lessen the weight of hand-power vehicles, and secure a direct application of the driving-power and lessen the friction in operating said vehicles.

The invention consists in a hand-power vehicle constructed with ratchet-wheels attached to the drive-wheel hubs and operated by flexible pawls connected by rods with levers pivoted to the side bars of the vehicle-frame, so that the propelling-power will be applied directly to the drive-wheels. The rear ends of the connecting-rods, when pushed back, and the forward parts of the flexible pawls, when drawn forward, are supported, and the said flexible pawls are kept from bending or buckling, while being pushed back for another stroke, by guides attached to the side bars of the vehicle-frame, as will be hereinafter fully described.

A represents the wheels, the axle B of which is attached to the rear end of the frame C. The frame C is formed of a bar bent into U shape, as shown in Fig. 1, and having a downward offset in its forward or bent part, as shown in Fig. 2.

To the center of the forward end of the frame C is rigidly attached, or upon it is formed, a forwardly-projecting arm, D, to the forward end of which is pivoted the standard E. The lower part of the standard E is forked, and to and between the lower ends of the branches thus formed is pivoted the small steering-wheel F.

To the upper end of the standard E is attached a cross-head, G, to the ends of which are pivoted the forward ends of two short rods, H. The rear parts of the rods H pass through guide-holes in the upper ends of short studs I, attached to the forward end of the frame C, and have cross-heads J attached to their rear ends. Upon the rods H, between the cross-head G and the studs I, are placed spiral springs K, of sufficient power to bring the wheel F into position parallel with the drive-wheels A, when the said wheel F is released after being turned to one side in guiding the vehicle.

L is the rider's seat, which is attached to the centers of cross-bars M, the ends of which are attached to the rear parts of the side bars of the frame C.

In using the vehicle, the rider rests his feet upon the front bar of the frame C, and when he wishes to turn to one side he places a foot upon the cross-head J of the rod H, upon the side from which he wishes to turn, and pushes the said rod forward, which turns the wheel F, and with it the vehicle, in the desired direction.

To the lower side of the arm D and the front bar of the frame C is attached the forward end of a spring, N, to the rear end of which is attached a brake-shoe, O, so that the rider can stop the vehicle by placing a foot upon the brake-shoe O and pressing the said shoe against the wheel F.

To the inner ends of the hubs of the wheels A are attached, or upon them are formed, ratchet-wheels P, with the teeth of which engage the flexible pawls Q. The pawls Q are made in the form of flat-linked chains, and their engaging ends are held against the teeth of the ratchet-wheels P by springs R, attached to the said flexible pawls Q at a little distance from their engaging ends, and the free ends of which press against the rear sides of the said engaging ends, as shown in Fig. 3. The other ends of the flexible pawls Q are attached to the rear ends of connecting-rods S, the forward ends of which are pivoted to the lower ends of the levers T. The levers T at a little distance from their lower ends are pivoted to the side bars of the frame C in such positions that the upper ends of the said levers can be readily reached and operated by the rider from his seat. The rear ends of the connecting-rods S, when pushed to the rearward, and the forward parts of the flexible pawls Q, when drawn forward, rest upon guides U, attached to the rear parts of the side bars of the frame C, to prevent the flexible pawls Q from folding or buckling when being pushed back for another stroke. With this construction, when the upper ends of the levers T are pushed forward, the flexible pawls Q will slide back over the teeth of the ratchet-wheels P, the engaging ends of the said pawls being held against the said teeth by the springs R. When the upper ends of the levers T are drawn to the rearward, the flexible pawls Q engage with the ratchet-wheels P and give a forward impulse to the drive-wheels A, the movements of which are unobstructed by the rearward movements of the pawls Q, so that there will be no lost motion and no lost power, the entire power of each stroke being expended in driving the vehicle forward.

To the side bars of the frame C, in the rear of the pivots of the levers T, are attached blocks V, having the upper and lower sides of their forward ends beveled for the said levers T to strike against as they are oscillated, to limit the movements of the said levers and prevent the flexible pawls Q from being carried so far in either direction that they will not operate properly.

This improvement can be applied to a bicycle by attaching the ratchet-wheels to the opposite ends of the drive-wheel hub and using the pawls and hand-levers in the manner hereinbefore described.

Having thus described my invention, I claim as new and desire to secure by Letters Patent—

1. In a hand-power vehicle, the combination, with the hubs or hub of the drive wheels or wheel A and the frame C, of the ratchet-wheels P, the flexible pawls Q, and the levers T, substantially as herein shown and described, whereby the propelling-power will be applied directly to the drive-wheels, as set forth.

2. The flexible pawl Q, constructed substantially as herein shown and described, with links so constructed that the said pawl will bend, as set forth.

3. In a hand-power vehicle, the combination, with the frame C, the connecting-rods S, and flexible pawls Q, of guides U, substantially as herein shown and described, whereby the said flexible pawls are kept from folding or buckling while being pushed back for another stroke, as set forth.

THOMAS A. DAVIES.

Witnesses:
JAMES T. GRAHAM,
C. SEDGWICK.